(12) United States Patent
Matsuo et al.

(10) Patent No.: US 11,973,658 B2
(45) Date of Patent: Apr. 30, 2024

(54) MODEL CONSTRUCTION APPARATUS, ESTIMATION APPARATUS, MODEL CONSTRUCTION METHOD, ESTIMATION METHOD AND PROGRAM

(71) Applicant: Nippon Telegraph and Telephone Corporation, Tokyo (JP)

(72) Inventors: Yoichi Matsuo, Musashino (JP); Keishiro Watanabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/927,027

(22) PCT Filed: Jun. 3, 2020

(86) PCT No.: PCT/JP2020/022009
§ 371 (c)(1),
(2) Date: Nov. 22, 2022

(87) PCT Pub. No.: WO2021/245854
PCT Pub. Date: Dec. 9, 2021

(65) Prior Publication Data
US 2023/0208723 A1    Jun. 29, 2023

(51) Int. Cl.
*H04L 41/14*    (2022.01)
*H04L 41/0677*    (2022.01)

(52) U.S. Cl.
CPC ........ *H04L 41/145* (2013.01); *H04L 41/0677* (2013.01)

(58) Field of Classification Search
None
See application file for complete search history.

(56) References Cited

U.S. PATENT DOCUMENTS

| | | | |
|---|---|---|---|
| 10,083,073 B2* | 9/2018 | Ambichl | G06F 11/3452 |
| 10,846,067 B2* | 11/2020 | Imazawa | G06N 7/01 |
| 2011/0209001 A1* | 8/2011 | Simma | H04L 41/142 709/224 |
| 2017/0075749 A1* | 3/2017 | Ambichl | G06F 11/3072 |
| 2019/0102680 A1* | 4/2019 | Liu | G06N 20/00 |
| 2020/0042426 A1* | 2/2020 | Ambichl | G06F 11/3495 |

(Continued)

OTHER PUBLICATIONS

Bennacer et al., "Self-Diagnosis Technique for Virtual Private Networks Combining Bayesian Networks and Case-Based Reasoning," Jan. 2015, IEEE Transactions on Automation Science and Engineering (vol. 12, Issue: 1), pp. 354-366 (Year: 2015).*

(Continued)

*Primary Examiner* — Ranodhi Serrao
(74) *Attorney, Agent, or Firm* — Fish & Richardson P.C.

(57) ABSTRACT

A model construction apparatus according to an embodiment includes a first collection unit that collects pieces of first observed data related to a communication network system that is a target for estimation of a location or a cause of an abnormality; a second collection unit that collects pieces of second observed data related to a plurality of services provided by the communication network system; and a model construction unit that constructs a causal model for estimating the location or the cause of the abnormality and an abnormal service among the plurality of services, using the pieces of first observed data and the pieces of second observed data.

6 Claims, 5 Drawing Sheets

(56) References Cited

U.S. PATENT DOCUMENTS

2020/0073641 A1* 3/2020 Imazawa .................. G06F 8/35
2021/0026341 A1* 1/2021 Iizuka et al. ......... G05B 13/042

OTHER PUBLICATIONS

Bennacer et al., "Self-diagnosis technique for virtual private networks combining bayesian networks and case-based reasoning," IEEE Transactions on Automation Science and Engineering, 2015, 12(1):354-366.
Ikeda et al., "Anomaly Detection and Interpretation using Multimodal Autoencoder and Sparse Optimization," arXiv:1812.07136 [stat.ML], Dec. 18, 2018, 20 pages.
Kandula et al., "Shrink: A tool for failure diagnosis in IP networks," Proceedings of the 2005 ACM SIGCOMM workshop on Mining network data, 2005, pp. 173-178.
Yan et al., "G-RCA: A Generic Root Cause Analysis Platform for Service Quality Management in Large IP Networks," IEEE/ACM Transactions on Networking, 2012, 20(6):1734-1747.

* cited by examiner

MODEL CONSTRUCTION APPARATUS, ESTIMATION APPARATUS, MODEL CONSTRUCTION METHOD, ESTIMATION METHOD AND PROGRAM

CROSS-REFERENCE TO RELATED APPLICATIONS

This application is a National Stage application under 35 U.S.C. § 371 of International Application No. PCT/JP2020/022009, having an International Filing Date of Jun. 3, 2020.

The disclosure of the prior application is considered part of the disclosure of this application, and is incorporated by reference in its entirety into this application.

TECHNICAL FIELD

The present invention relates to a model construction apparatus, an estimation apparatus, a model construction method, an estimation method, and a program.

BACKGROUND ART

For communication common carriers, identifying an abnormal state that occurs in a communication network system and promptly dealing with the abnormal state is an important task. Thus, research has been performed so far on a method for detecting an abnormality that has occurred in a communication network system in an early stage, and a method for estimating a location or a cause of an abnormality, for example.

As a method for estimating a location or a cause of an abnormality, there has been proposed a method that includes modeling the relationship between a location or a cause of an abnormality and changes in data (hereinafter also referred to as "observed data") in a communication network system caused due to the abnormality as a causal model, using a Bayesian network, and then estimating a location or a cause of an abnormality from observed data when an abnormality has occurred (Non-Patent Literatures 1 to 3). As such a method, a rule-based method is known.

In the rule-based method, the relationship between a location or a cause of an abnormality and changes in observed data is modeled using the knowledge of an expert (for example, an operator of a communication network system). For example, in Non-Patent Literature 1, a rule, which defines that each router in a normal or abnormal state affects only observed data of an adjacent link, is created from the knowledge of an expert, and a causal model is constructed using such a rule and the adjacency relationship of the topology of a communication network system. In addition, Non-Patent Literature 2 proposes creating a template as an abstract rule to facilitate the construction of a causal model. Further, in Non-Patent Literature 3, which is targeted for a virtual communication network, such as a virtual private network (VPN), a set of devices as a root cause is extracted from a given VPN so that the relationship between a cause of an abnormality that has occurred in the set of devices or a device in which an abnormality has occurred and observed data is modeled.

Incidentally, a communication network system provides various services, such as a VPN and various applications, in addition to a communication function. In particular, in recent years, the number of services provided by a communication network system has increased with the development of the virtualization techniques, for example. Therefore, for operating a communication network system, it is extremely important to comprehensively monitor a plurality of services so as to identify which service has an abnormality and which service is affected. This is because a method that should be used to deal with an abnormality or its effects differs depending on services.

CITATION LIST

Non-Patent Literature

Non-Patent Literature 1: Srikanth Kandula, Dina Katabi, and Jean-philippe Vasseur. Shrink: A tool for failure diagnosis in IP networks. Proceedings of the 2005 ACM SIGCOMM workshop on Mining network data, pages 173-178, 2005.

Non-Patent Literature 2: He Yan, Lee Breslau, Zihui Ge, Dan Massey, Dan Pei, and Jennifer Yates. G-RCA: A Generic Root Cause Analysis Platform for Service Quality Management in Large IP Networks. IEEE/ACM Transactions on Networking, 20(6):1734-1747, 2012.

Non-Patent Literature 3: Leila Bennacer, Yacine Amirat, Abdelghani Chibani, Abdelham id Mellouk, and Laurent Ciavaglia, Self-diagnosis technique for virtual private networks combining bayesian networks and case-based reasoning, IEEE Transactions on Automation Science and Engineering, vol: 12(1) pp: 354-366, 2015.

SUMMARY OF THE INVENTION

Technical Problem

However, with the conventional method for estimating a location or a cause of an abnormality, it has been impossible to comprehensively construct a model, taking into account the relationship with a plurality of services provided by a communication network system.

An embodiment of the present invention has been made in view of the foregoing, and it is an object of the present invention to construct a causal model for estimating a location or a cause of an abnormality including an abnormality of a plurality of services provided by a communication network system.

Means for Solving the Problem

To achieve the aforementioned object, a model construction apparatus according to an embodiment includes a first collection unit that collects pieces of first observed data related to a communication network system that is a target for estimation of a location or a cause of an abnormality; a second collection unit that collects pieces of second observed data related to a plurality of services provided by the communication network system; and a model construction unit that constructs a causal model for estimating the location or the cause of the abnormality and an abnormal service among the plurality of services, using the pieces of first observed data and the pieces of second observed data.

Effects of the Invention

It is possible to construct a causal model for estimating a location or a cause of an abnormality including an abnormality of a plurality of services provided by a communication network system.

DESCRIPTION OF EMBODIMENTS

Figure 1:
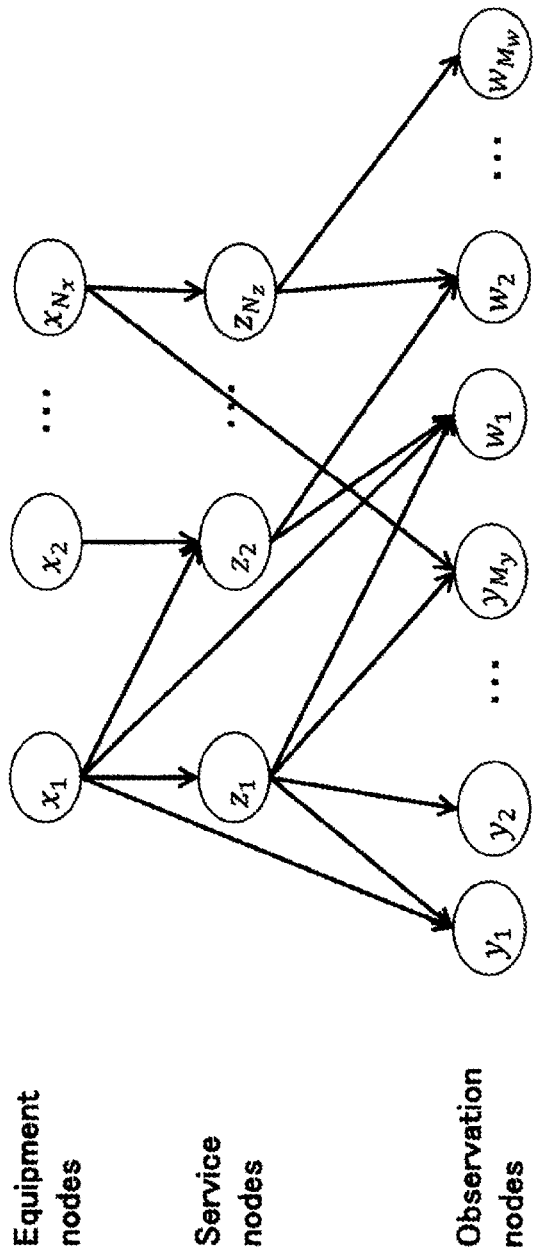
FIG. 1 is a view illustrating an exemplary graphical model.

Hereinafter, an embodiment of the present invention will be described. In the present embodiment, an estimation apparatus 10 will be described that constructs a causal model from observed data obtained from a communication network system, and estimates a location or a cause of an abnormality in the communication network system as well as an abnormality of a plurality of services provided by the communication network system, using the causal model. Herein, the estimation apparatus 10 according to the present embodiment includes a "model construction phase" in which a causal model is constructed from observed data obtained in the past, and an "estimation phase" in which a location or a cause of an abnormality (including a service having an abnormality) is estimated from observed data when an abnormality has occurred, using the causal model. It should be noted that the estimation apparatus 10 in the model construction phase may also be referred to as a "model construction apparatus," for example. In addition, the communication network system is a system that implements a communication network environment having various devices (for example, a router and a server) as nodes, and having communication paths and the like as links, and may also be referred to as an information and communication technology (ICT) system, for example.

<Theoretical Configuration>

Described first is a theoretical configuration related to the construction of a causal model in the model construction phase and the estimation of a location or a cause of an abnormality in the estimation phase.

In the present embodiment, for the construction of a causal model, which is represented by a Bayesian network as one of graphical models, a multi-layer Bayesian network is used to construct a causal model that represents the comprehensive relationship including the relationship with a plurality of services provided by a communication network system in addition to the relationship between each of the apparatuses forming the communication network system, a cause of an abnormality, or the like, and observed data. Accordingly, using such a causal model allows for the estimation of a location or a cause of an abnormality (including a service having an abnormality) from observed data. That is, using such a causal model allows for the estimation of a location or a cause of an abnormality in the communication network system as well as a service having an abnormality (hereinafter also referred to as an "abnormal service") among a plurality of services provided by the communication network system. It should be noted that examples of services provided by the communication network include a VPN and various applications (for example, a voice call service based on Voice over Internet Protocol (VoIP), a file transfer service, and a streaming-video service).

Hereinafter, a case where a location of an abnormality in a communication network system is estimated is assumed, for example, and a case will be described where an apparatus in which an abnormality has occurred is estimated as the location of the abnormality. It should be noted that when an apparatus i described below is assumed as a cause i, the following description is similarly applicable to the estimation of a cause of an abnormality. In addition, when i is assumed as representing both an apparatus and a cause, it is possible to concurrently estimate a location and a cause of an abnormality.

It is assumed that the state of the apparatus i in the communication network system is represented by $x_i$, where $i \in \{1, \ldots, N_x\}$, and the state of observed data j related to the communication network is represented by $y_j$, where $j \in \{1, \ldots, M_y\}$. The observed data j related to the communication network is information representing the state of the entire communication network system, for example, and includes syslog or traffic information, for example. $N_x$ represents the number of apparatuses forming the communication network system, and $M_y$ represents the number of pieces of observed data related to the communication network. It is assumed that each of $x_i$ and $y_j$ has a value of either 0 (i.e., a normal state) or 1 (i.e., an abnormal state). However, each of $x_i$ and $y_j$ may not be a binary value of 0 or 1 but a multilevel value of a ternary value or greater, or a continuous value.

It should be noted that as the observed data j related to the communication network, it is possible to use not only syslog or traffic information, for example, but also the causal degree described in a reference document "Yasuhiro Ikeda, Keisuke Ishibashi, Yuusuke Nakano, Keishiro Watanabe, Ryoichi Kawahara, "Anomaly Detection and Interpretation using Multimodal Autoencoder and Sparse Optimization", arXiv: 1812.07136 [stat.ML]," for example.

The state $y_j$ of the observed data j related to the communication network may be determined by, for example, when the observed data j (which may include the causal degree) related to the communication network is a continuous value, determining a threshold from the value of the observed data j in the normal state, and then setting the value of the state $y_j$ of the observed data j that is greater than or equal to (or less than or equal to) the threshold to 1, and setting other values of the state $y_j$ of the observed data j to 0. Alternatively, the state $y_j$ of the observed data j related to the communication network may be determined by calculating the dispersion of the observed data j in the normal state, and then setting the value of the state $y_j$ of the observed data j that is outside L (where L is a predetermined given natural number) sigmas to 1, and setting other values of the state $y_j$ of the observed data j to 0.

It is also assumed that the state of a service k provided by the communication network system is represented by $z_k$, where $k \in \{1, \ldots, N_z\}$, and the state of observed data h related to the service is represented by $w_h$, where $h \in \{1, \ldots, M_w\}$. The observed data h related to the service is information representing the state or the like of a service provided by the communication network system, and includes log information related to the service, for example. $N_z$ represents the number of services provided by the communication network system, and $M_w$ represents the number of pieces of observed data related to a service. It is assumed that each of $z_k$ and $w_h$ has a value of either 0 (i.e., a normal state) or 1 (i.e., an abnormal state). However, as with $x_i$ and $y_j$, each of $z_k$ and $w_h$ may not be a binary value of 0 or 1 but a multilevel value of a ternary value or greater, or a continuous value. The state $w_h$ of the observed data h related to a service may be identified or calculated from the content of log information, for example (e.g., the value of the state $w_h$ may be determined to be 1 when an error message or an error code is contained, for example, and otherwise, the value of the state $w_h$ may be determined to be 0).

In the present embodiment, a causal model is constructed with the variables $z_k$ and $w_h$ related to a service in addition to $x_i$ and $y_j$ used for the conventional causal model. That is, the probability $P(y_j, w_h|x_i, z_k)$ of the state $y_j$ of the observed data j and the state $w_h$ of the observed data h related to a service when the state $x_i$ of the apparatus i related to the communication network and the state $z_k$ of the service k are obtained is constructed as a causal model. Such a causal model is defined from the probability $P(x_i, z_k, y_j, w_h)$, the prior probability $P(x_i)$, and the prior probability $P(z_k)$ based on the definition of the conditional probability. In practice, the posterior probability $P(x_i, z_k|y_j, w_h)$ of the state $x_i$ of the apparatus i and the state $z_k$ of the service k when the state $y_j$ of the observed data j and the state $w_h$ of the observed data h related to a service are obtained is calculated using the Bayes' theorem. That is, the posterior probability $P(x_i, z_k|y_j, w_h)$ is calculated from the causal model using the Bayes' theorem.

Herein, a service provided by a communication network system is communicated using an apparatus included in the communication network system. Thus, when an apparatus, which passes a packet related to the service k, has an abnormality, the service k is also affected. In addition, the state $w_h$ of the observed data h related to the service k is also affected. Further, even when none of the apparatuses forming the communication network system has an abnormality, if the service k has an abnormality, the state $w_h$ of the observed data h related to the service k is affected.

Therefore, from the foregoing, the probability $P(x_i, z_k, y_j, w_h)$ can be formulated as follows.

$$P(x_1, \ldots, x_{N_x}, z_1, \ldots, z_{N_z}, y_1, \ldots, y_{M_y}, w_1, \ldots, w_{M_w}) = \quad \text{[Math. 1]}$$

$$P(y_1, \ldots, y_{M_y}|x_1, \ldots, x_{N_x})P(z_1, \ldots, z_{N_z}|x_1, \ldots, x_{N_x})$$

$$P(w_1, \ldots, w_{M_w}|x_1, \ldots, x_{N_x}, z_1, \ldots, z_{N_z})$$

$$P(z_1, \ldots z_{N_z})P(x_1, \ldots, x_{N_x})$$

In this manner, the probability $P(x_i, z_k, y_j, w_h)$ can be defined based on the conditional probabilities $P(y_j|x_i)$, $P(z_k|x_i)$, and $P(w_h|x_i, z_k)$ and the prior probabilities $P(z_k)$ and $P(x_i)$. Herein, FIG. 1 illustrates an example of a graphical model (i.e., a Bayesian network) representing the causal model including the states $x_i$, the states $z_k$, the states $y_j$, and the states $w_h$ as nodes. In the example illustrated in FIG. 1, the states $x_i$ are represented as "Equipment nodes," the states $z_k$ are represented as "Service nodes," and the states $y_j$ and $w_h$ are represented as "Observation nodes." With such a causal model, the formulation indicated by Expression 1 above is obtained.

Various methods may be used to define the actual probability value of the probability $P(x_i, z_k, y_j, w_h)$. For example, the actual probability value may be defined as follows using predetermined constants $\alpha_x$, $\alpha_z$, $\beta_y$, $\beta_w$, and $\gamma$.

$$P(x_1, \ldots, x_{N_x}, z_1, \ldots, z_{N_z}, y_1, \ldots, y_{M_y}, w_1, \ldots, w_{M_w}) = \quad \text{[Math. 2]}$$

$$\prod_{i=1}^{N_x}\prod_{k=1}^{N_z}\prod_{j=1}^{M_y}\prod_{h=1}^{M_w} \alpha_x^{x_i}(1-\alpha_x)^{1-x_i}\alpha_z^{z_k}(1-a_z)^{1-z_k}$$

-continued $$\beta_y^{\delta(x_i=y_j)\phi_{i,j}^{xy}}(1-\beta_y)^{\delta(x_i\neq y_j)\phi_{i,j}^{xy}}\gamma^{\delta(x_i=z_k)\phi_{i,k}^{xz}}(1-\gamma)^{\delta(x_i\neq z_k)\phi_{i,k}^{xz}}\Phi$$

Herein, $\delta$ is a function that returns 1 if true, and returns 0 if false. $\phi^{xy}$ is a distribution representing the causal relationship between $x_i$ and $y_j$, and is a matrix of $N_x \times M_y$ in which the (i, j) elements indicate 1 if $x_i$ and $y_j$ are related, and the (i, j) elements indicate 0 in other cases. Likewise, $\phi^{xz}$ is a distribution representing the causal relationship between $x_i$ and $z_k$, and is a matrix of $N_x \times N_z$ in which the (i, k) elements indicate 1 if $x_i$ and $z_k$ are related, and the (i, k) elements indicate 0 in other cases. In addition, $\Phi$ is represented as follows.

$$\Phi = \lambda_1^{\delta(x_i=z_k=w_h)\phi_{i,k,h}^{xzw}} \lambda_2^{\delta(x_i=w_h)\delta(z_k\neq w_h)\phi_{i,k,h}^{xzw}} \quad \text{[Math. 3]}$$

$$\lambda_3^{\delta(x_i\neq w_h)\delta(z_k=w_h)\phi_{i,k,h}^{xzw}} \lambda_4^{\delta(x_i=w_h)\delta(z_k\neq w_h)\phi_{i,k,h}^{xzw}}$$

It should be noted that $$\sum_{s=1}^{4}\lambda_s = 1 \quad \text{[Math. 4]}$$

In addition, $\phi^{xzw}$ is a distribution representing the causal relationship among $x_i$, $z_k$, and $w_h$, and is a tensor of $N_x \times N_z \times M_w$ in which the (i, k, h) elements indicate 1 if $x_i$, $z_k$, and $w_h$ are related, and the (i, k, h) elements indicate 0 in other cases.

Accordingly, as the probability $P(x_i, z_k, y_j, w_h)$ can be calculated, a causal model can be constructed. Thus, the posterior probability $P(x_i, z_k|y_j, w_h)$ of the state $x_i$ of the apparatus i and the state $z_k$ of the service k when the state $y_j$ of the observed data j related to the communication network and the state $w_h$ of the observed data h related to the service are obtained can be calculated from the causal model. It should be noted that the prior probability $P(y_j, w_h)$ can be calculated from the state $y_j$ of the observed data j related to the communication network and the state $w_h$ of the observed data h related to the service.

As described above, not only the relationship between the state $x_i$ of each of the apparatuses i forming the communication network and the state $y_j$ of the observed data j, but also the relationship between the state $z_k$ of the service k provided by the communication network and the state $w_h$ of the observed data h related to the service, the relationship between the state $z_k$ of the service k and the state $x_i$ of the apparatus i related to the service k, and the relationship between the state $z_k$ of the service k and the state $y_j$ of the observed data j are modeled with a Bayesian network (that is, modeled with a multi-layer Bayesian network) so that a causal model represented by the Bayesian network is constructed. Accordingly, it is possible to estimate not only an abnormal apparatus (or a cause of an abnormality) in the communication network system but also an abnormal service.

<Functional Configuration>

Figure 2:
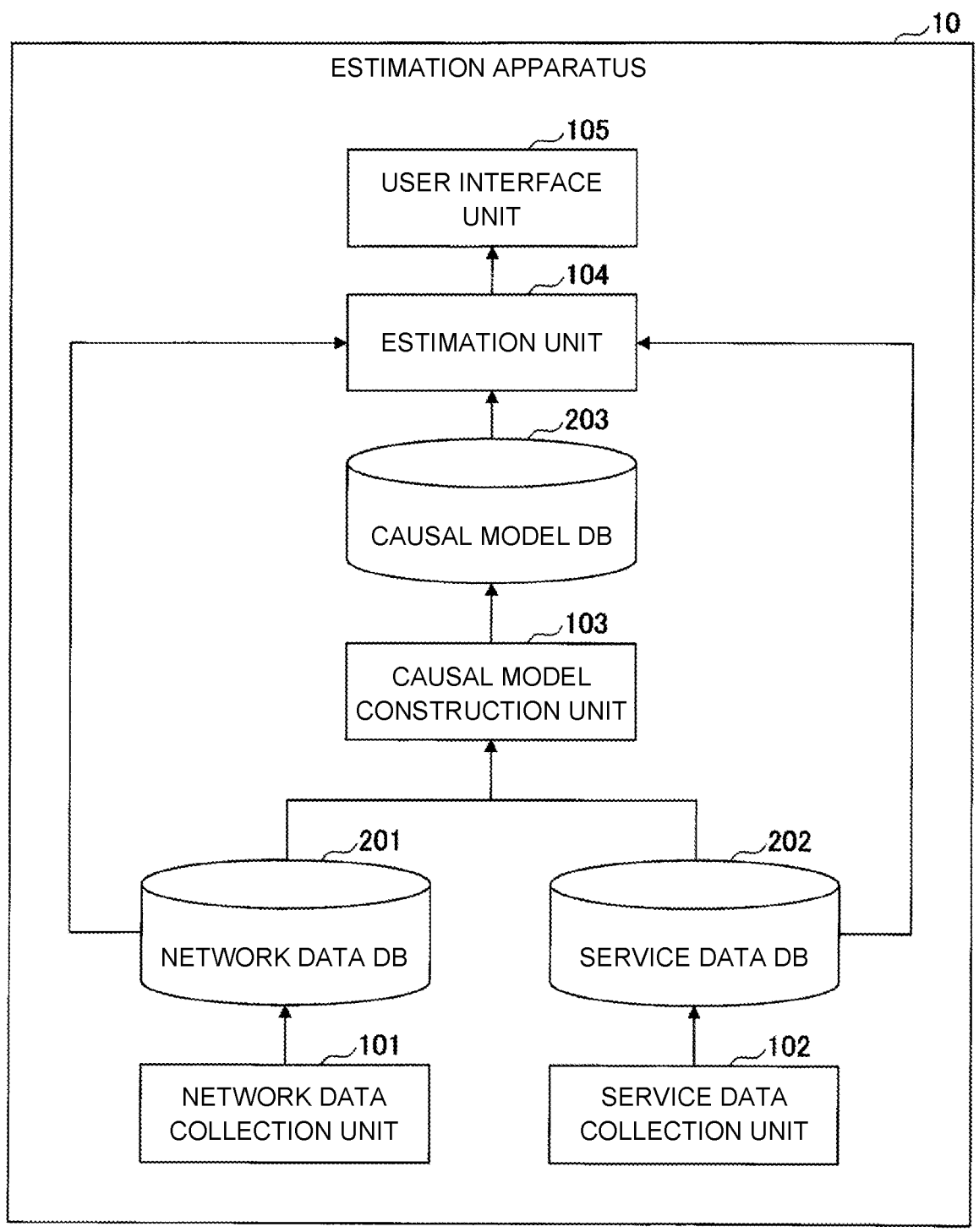
FIG. 2 is a diagram illustrating an exemplary functional configuration of an estimation apparatus according to the present embodiment.

Next, the functional configuration of the estimation apparatus 10 according to the present embodiment will be described with reference to FIG. 2. FIG. 2 is a diagram illustrating an exemplary functional configuration of the estimation apparatus 10 according to the present embodiment.

As illustrated in FIG. 2, the estimation apparatus 10 according to the present embodiment includes a network data collection unit 101, a service data collection unit 102, a causal model construction unit 103, an estimation unit 104, a user interface unit 105, a network data DB 201, a service data DB 202, and a causal model DB 203.

The network data collection unit 101 collects network configuration data and pieces of observed data related to a communication network from a communication network system. The network configuration data and the pieces of observed data collected by the network data collection unit 101 are stored in the network data DB 201. Herein, the network configuration data is information representing the topology of the communication network (that is, information representing the connection relationship among apparatuses forming the communication network system, for example). With the network configuration data, the apparatus i, where $i \in \{1, \ldots, N_x\}$ is identified.

The service data collection unit 102 collects pieces of service-related data and observed data related to the services from the communication network system. The pieces of service-related data and observed data collected by the service data collection unit 102 are stored in the service data DB 202. Herein, the service-related data is information representing a service provided by the communication network system (for example, service ID). With the service-related data, the service k, where $k \in \{1, \ldots, N_z\}$ is identified.

The causal model construction unit 103 constructs a causal model for calculating the posterior probability of the state of each apparatus and the state of each service when the state of each of the pieces of observed data related to the communication network and the state of each of the pieces of observed data related to the service are obtained. The causal model constructed by the causal model construction unit 103 is stored in the causal model DB 203.

The estimation unit 104 estimates a location or a cause of an abnormality in the communication network system and an abnormal service, using the causal model stored in the causal model DB 203.

The user interface unit 105 presents to a user (for example, an operator of the communication network system) the results of estimation (i.e., the location or the cause of the abnormality and the abnormal service) obtained by the estimation unit 104 and its probability.

<Process of Constructing Causal Model>

Figure 3:
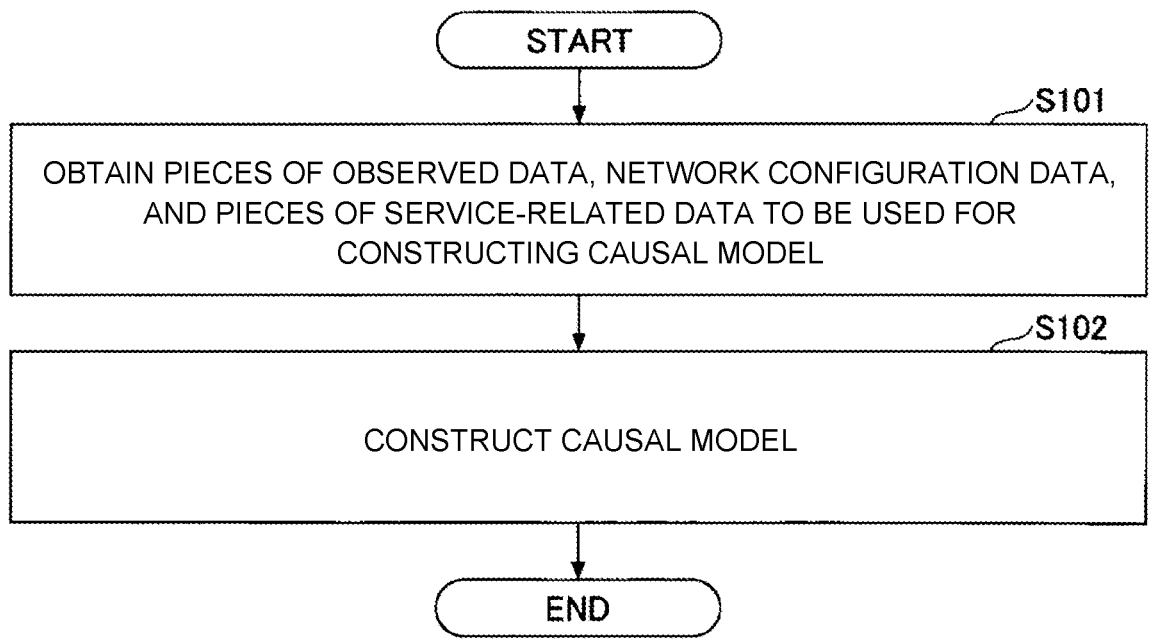
FIG. 3 is a flowchart illustrating an exemplary process of constructing a causal model according to the present embodiment.

Next, a process performed in constructing a causal model with the estimation apparatus 10 according to the present embodiment in the model construction phase will be described with reference to FIG. 3. FIG. 3 is a flowchart illustrating an exemplary process of constructing a causal model according to the present embodiment. It should be noted that hereinafter, it is assumed that network configuration data and pieces of observed data collected by the network data collection unit 101 are stored in the network data DB 201, and also, pieces of service-related data and observed data collected by the service data collection unit 102 are stored in the service data DB 202. It is also assumed that the values of the states $y_j$ of the pieces of observed data j collected by the network data collection unit 101 are calculated, and the pieces of observed data j and their states $y_j$ are associated with each other to be stored in the network data DB 201. Likewise, it is assumed that the values of the states $w_h$ of the pieces of observed data h collected by the service data collection unit 102 are calculated or identified, and the pieces of observed data h and their states $w_h$ are associated with each other to be stored in the service data DB 202.

Step S101: The causal model construction unit 103 obtains from the network data DB 201 pieces of observed data j obtained in the past, their states $y_j$, and the network configuration data to be used for constructing a model, and also obtains from the service data DB 202 pieces of observed data h obtained in the past, their states $w_h$, and pieces of service-related data to be used for constructing a model.

Step S102: Then, the causal model construction unit 103 constructs the probability $P(y_j, w_h | x_i, z_k)$ as a causal model using the pieces of observed data j, their states $y_j$, the network configuration data, the pieces of observed data h, their states $w_h$, and the pieces of service-related data obtained in step S101 described above. It should be noted that the causal model is stored in the causal model DB 203.

Accordingly, in the model construction phase, the estimation apparatus 10 according to the present embodiment constructs a causal model representing the relationship between the state $x_i$ of each of the apparatuses i forming the communication network and the state $y_j$ of the observed data j, the relationship between the state $z_k$ of the service k provided by the communication network and the state $w_h$ of the observed data h related to the service, the relationship between the state $z_k$ of the service k and the state $x_i$ of the apparatus i related to the service k, and the relationship between the state $z_k$ of the service k and the state $y_j$ of the observed data j. Accordingly, it is possible to obtain a causal model that can estimate not only an abnormal apparatus (or a cause of an abnormality) in the communication network system but also an abnormal service.

<Process of Estimating Location or Cause of Abnormality>

Figure 4:
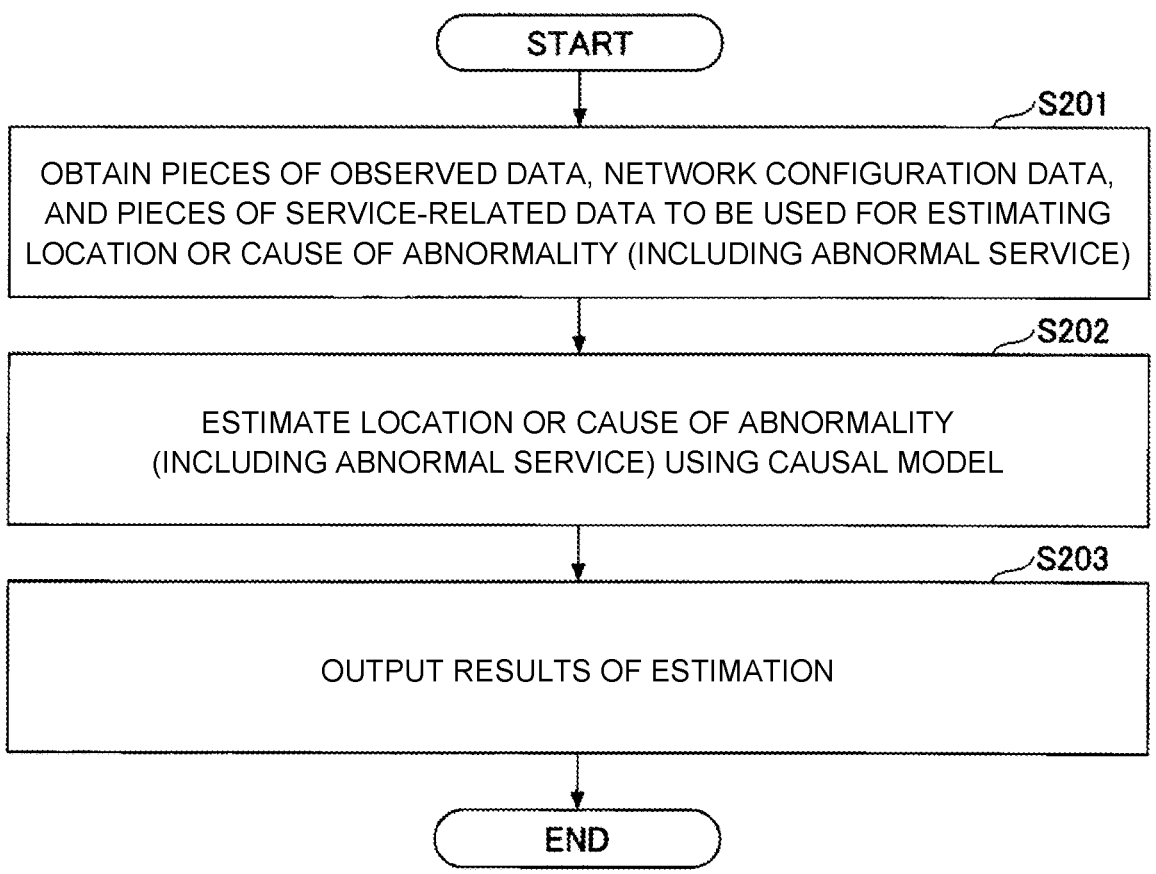
FIG. 4 is a flowchart illustrating an exemplary process of estimating a location or a cause of an abnormality according to the present embodiment.

Next, a process performed in estimating a location or a cause of an abnormality (including an abnormal service) with the estimation apparatus 10 according to the present embodiment in the estimation phase will be described with reference to FIG. 4. FIG. 4 is a flowchart illustrating an exemplary process of estimating a location or a cause of an abnormality according to the present embodiment. It should be noted that hereinafter, it is assumed that network configuration data and pieces of observed data collected by the network data collection unit 101 are stored in the network data DB 201, and also, pieces of service-related data and observed data collected by the service data collection unit 102 are stored in the service data DB 202. In addition, it is also assumed that the values of the states $y_j$ of the pieces of observed data j collected by the network data collection unit 101 are calculated, and the pieces of observed data j and their states $y_j$ are associated with each other to be stored in the network data DB 201. Likewise, it is assumed that the values of the states $w_h$ of the pieces of observed data h collected by the service data collection unit 102 are calculated or identified, and the pieces of observed data h and their states $w_h$ are associated with each other to be stored in the service data DB 202.

Step S201: The estimation unit 104 obtains from the network data DB 201 pieces of observed data j, their states $y_j$, and the network configuration data to be used for estimating a location or a cause of an abnormality (including an abnormal service), and also obtains from the service data DB 202 pieces of observed data h, their states $w_h$, and pieces of service-related data to be used for estimating a location or a cause of an abnormality (including an abnormal service). Herein, as the pieces of observed data j and the pieces of observed data h, it is considered that pieces of observed data j and pieces of observed data h when some abnormality has occurred in the communication network system or when some abnormality has occurred in a service provided by the communication network system are obtained, for example.

Step S202: Next, the estimation unit 104 estimates a location or a cause of an abnormality or an abnormal service with the causal model stored in the causal model DB 203, using the states $y_j$ of the pieces of observed data j and the states $w_h$ of the pieces of observed data h obtained in step S201 described above. That is, the estimation unit 104 calculates the posterior probability $P(x_i, z_k|y_j, w_h)$ from the causal model using the Bayes' theorem, and estimates a location or a cause of an abnormality or an abnormal service corresponding to the maximum probability. It should be noted that when the posterior probability $P(x_i, z_k|y_j, w_h)$ for given $x_i$ is maximum, the apparatus i (or the cause i) corresponding to the $x_i$ is estimated as a location of an abnormality (or a cause of an abnormality), and when the posterior probability $P(x_i, z_k|y_j, w_h)$ for given $z_k$ is maximum, the service k corresponding to the $z_k$ is estimated as an abnormal service.

Step S203: The user interface unit 105 outputs the results of estimation (that is, the location or the cause of the abnormality or the abnormal service, and its probability) of step S202 described above to a display, for example, to present the results to a user.

Accordingly, in the estimation phase, the estimation apparatus 10 according to the present embodiment can estimate a location or a cause of an abnormality as well as an abnormal service using the causal model constructed in the model construction phase. This allows a user, such as an operator of the communication network system, to comprehensively monitor not only a location or a cause of an abnormality in the communication network system but also a plurality of services, and thus identify which service has an abnormality and which service is affected, for example.

<Hardware Configuration>

Figure 5:
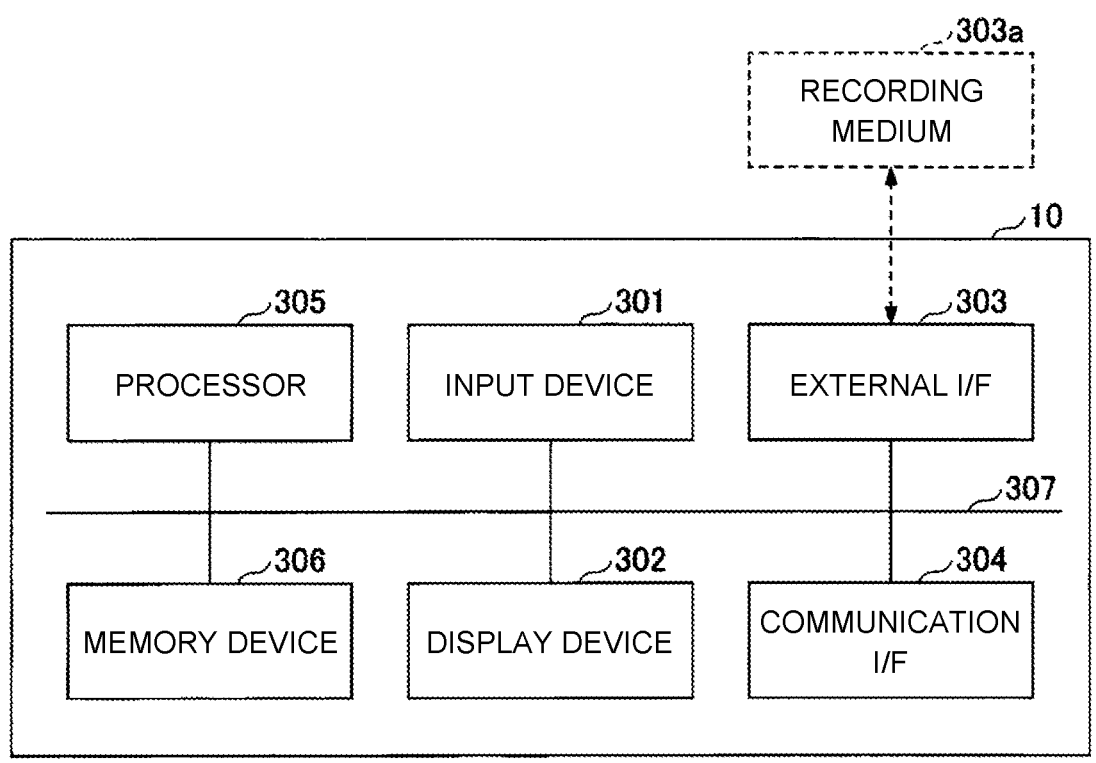
FIG. 5 is a diagram illustrating an exemplary hardware configuration of the estimation apparatus according to the present embodiment.

Finally, the hardware configuration of the estimation apparatus 10 according to the present embodiment will be described with reference to FIG. 5. FIG. 5 is a diagram illustrating an exemplary hardware configuration of the estimation apparatus 10 according to the present embodiment.

As illustrated in FIG. 5, the estimation apparatus 10 according to the present embodiment is implemented with a common computer or computer system, and includes an input device 301, a display device 302, an external I/F 303, a communication I/F 304, a processor 305, and a memory device 306. Such pieces of hardware are connected via a bus 307 so as to be capable of communicating with each other.

The input device 301 is a keyboard, a mouse, or a touch panel, for example. The display device 302 is a display, for example. It should be noted that the estimation apparatus 10 may not include at least one of the input device 301 and the display device 302.

The external I/F 303 is an interface with an external device, such as a recording medium 303a. The estimation apparatus 10 can read data from or write data to the recording medium 303a via the external I/F 303, for example. The recording medium 303a may store one or more programs that implement the functional units (i.e., the network data collection unit 101, the service data collection unit 102, the causal model construction unit 103, the estimation unit 104, and the user interface unit 105) of the estimation apparatus 10, for example. It should be noted that examples of the recording medium 303a include a compact disc (CD), a digital versatile disk (DVD), a secure digital memory card (SD memory card) and a universal serial bus (USB) memory card.

The communication I/F 304 is an interface for connecting the estimation apparatus 10 to a communication network. It should be noted that one or more programs that implement the functional units of the estimation apparatus 10 may be obtained (i.e., downloaded) from a predetermined server device, for example, via the communication I/F 304.

The processor 305 includes various arithmetic units, such as a central processing unit (CPU), for example. The functional units of the estimation apparatus 10 are implemented through processes executed by the processor 305 based on one or more programs stored in the memory device 306, for example.

The memory device 306 includes various storage devices, such as a hard disk drive (HDD), a solid state drive (SSD), a random access memory (RAM), a read only memory (ROM), and a flash memory, for example. Each of the DBs (i.e., the network data DB 201, the service data DB 202, and the causal model DB 203) of the estimation apparatus 10 can be implemented with the memory device 306. It should be noted that at least one of the DBs may be implemented with a storage device (for example, a database server) connected to the estimation apparatus 10 via a communication network.

With the estimation apparatus 10 according to the present embodiment having the hardware configuration illustrated in FIG. 5, it is possible to implement the process of constructing a causal model and the process of estimating a location or a cause of an abnormality described above. It should be noted that the hardware configuration illustrated in FIG. 5 is only exemplary, and thus, the estimation apparatus 10 may have other hardware configurations. For example, the estimation apparatus 10 may include a plurality of processors 305 or a plurality of memory devices 306.

The present invention is not limited to the embodiment specifically disclosed above, and can be modified or changed in various ways or combined with the existing techniques without departing from the scope of the claims.

REFERENCE SIGNS LIST

10 Estimation apparatus
101 Network data collection unit
102 Service data collection unit
103 Causal model construction unit
104 Estimation unit
105 User interface unit
201 Network data DB
202 Service data DB
203 Causal model DB
301 Input device
302 Display device
303 External I/F
303a Recording medium
304 Communication I/F
305 Processor
306 Memory device
307 Bus

The invention claimed is:

1. A model construction apparatus comprising:
a memory; and
a processor configured to execute
collecting pieces of first observed data related to a communication network system that is a target for estimation of a location or a cause of an abnormality, wherein the pieces of first observed data comprise network traffic information of communication network system;

collecting pieces of second observed data related to a plurality of services provided by the communication network system, wherein the pieces of second observed data comprise information on states of services provided by the communication network system; and constructing a causal model for estimating the location or the cause of the abnormality and an abnormal service among the plurality of services, using the pieces of first observed data and the pieces of second observed data, wherein the causal model is represented by a direct graph comprising:
  (i) a set of equipment nodes in a first layer in a Bayesian network, each equipment node representing a respective state of a respective apparatus of the communication network system;
  (ii) a set of service nodes in a second layer in the Bayesian network, each service node representing a respective state of a respective service provided by the communication network system; and
  (iii) a set of observation nodes in a third layer in the Bayesian network, each observation node representing a piece of observed data;

using the constructed causal model to (i) estimate the location or the cause of the abnormality upon identifying a first service being abnormal, the first service being represented by a first service node in the second layer, (ii) generate, in response to the first service being identified as abnormal, a posterior probability of occurrence of abnormality for each of the services provided by the communication network system, and (iii) identify a second service node in the second layer, which associates with a second service different from the first service, based on the posterior probability of occurrence of abnormality; and outputting, via a user interface, (i) the estimated location or the cause of the abnormality and (ii) the identified second service associated with the second service node.

2. The model construction apparatus according to claim 1, wherein the constructing includes constructing as the causal model a probability model by modeling, with a Bayesian network,
  a relationship between a state of a location or a cause of an abnormality in the communication network system and a state of one of the pieces of first observed data,
  a relationship between a state of the service and one of the pieces of second observed data,
  a relationship between the state of the service and a state of a location or a cause related to the service, and
  a relationship between the state of the service and a state of one of the pieces of first observed data.

3. The model construction apparatus according to claim 2, wherein the causal model is a probability model capable of calculating a posterior probability using a Bayes' theorem, the posterior probability representing the state of the location or the cause and the state of the service when the state of one of the pieces of first observed data and the state of one of the pieces of second observed data are obtained.

4. An estimation apparatus comprising:
  a memory; and
  a processor configured to execute
    collecting pieces of first observed data related to a communication network system that is a target for estimation of a location or a cause of an abnormality, wherein the pieces of first observed data comprise network traffic information of communication network system;

collecting pieces of second observed data related to a plurality of services provided by the communication network system, wherein the pieces of second observed data comprises information of states of services provided by the communication network system;

constructing a causal model for estimating the location or the cause of the abnormality and an abnormal service among the plurality of services, using the pieces of first observed data and the pieces of second observed data, wherein the causal model is represented by a direct graph comprising:
      (i) a set of equipment nodes in a first layer in a Bayesian network, each equipment node representing a respective state of a respective apparatus of the communication network system;
      (ii) a set of service nodes in a second layer in the Bayesian network, each service node representing a respective state of a respective service provided by the communication network system; and
      (iii) a set of observation nodes in a third layer in the Bayesian network, each observation node representing a piece of observed data;

using the constructed causal model to (i) estimate the location or the cause of the abnormality upon identifying a first service being abnormal, the first service being represented by a first service node in the second layer, (ii) generate, in response to the first service being identified as abnormal, a posterior probability of occurrence of abnormality for each of the services provided by the communication network system, and (iii) identify a second service node in the second layer, which associates with a second service different from the first service, based on the posterior probability of occurrence of abnormality; and outputting, via a user interface, (i) the estimated location or the cause of the abnormality and (ii) the identified second service associated with the second service node.

5. A model construction method executed by a computer including a memory and processor, the method comprising:
  collecting pieces of first observed data related to a communication network system that is a target for estimation of a location or a cause of an abnormality, wherein the pieces of first observed data comprise network traffic information of communication network system;

collecting pieces of second observed data related to a plurality of services provided by the communication network system, wherein the pieces of second observed data comprises information of states of services provided by the communication network system;

constructing a causal model for estimating the location or the cause of the abnormality and an abnormal service among the plurality of services, using the pieces of first observed data and the pieces of second observed data, wherein the causal model is represented by a direct graph comprising:
    (i) a set of equipment nodes in a first layer in a Bayesian network, each equipment node representing a respective state of a respective apparatus of the communication network system;
    (ii) a set of service nodes in a second layer in the Bayesian network, each service node representing a respective state of a respective service provided by the communication network system; and (iii) a set of observation nodes in a third layer in the Bayesian network, each observation node representing a piece of observed data;

using the constructed causal model to (i) estimate the location or the cause of the abnormality upon identifying a first service being abnormal, the first service being represented by a first service node in the second layer, (ii) generate, in response to the first service being identified as abnormal, a posterior probability of occurrence of abnormality for each of the services provided by the communication network system, and (iii) identify a second service node in the second layer, which associates with a second service different from the first service, based on the posterior probability of occurrence of abnormality; and outputting, via a user interface, (i) the estimated location or the cause of the abnormality and (ii) the identified second service associated with the second service node.

6. A non-transitory computer-readable recording medium having computer-readable instructions stored thereon, which when executed, cause a computer including a memory and a processor to execute the model construction method according to claim 5.

\* \* \* \* \*